Aug. 18, 1953 — P. WEYNAND — 2,648,938
VALVE SEAT GRINDING APPARATUS
Filed Dec. 29, 1952
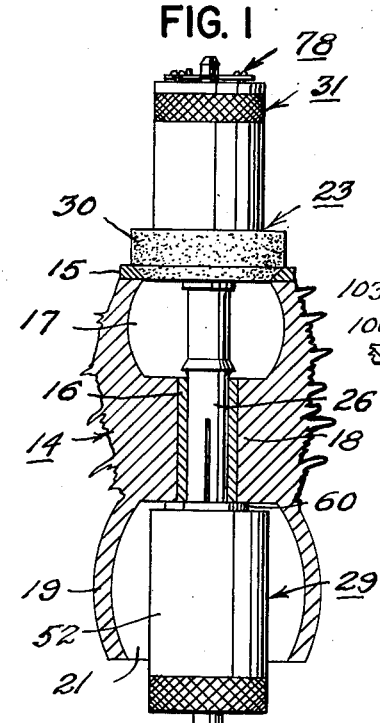
FIG. 1
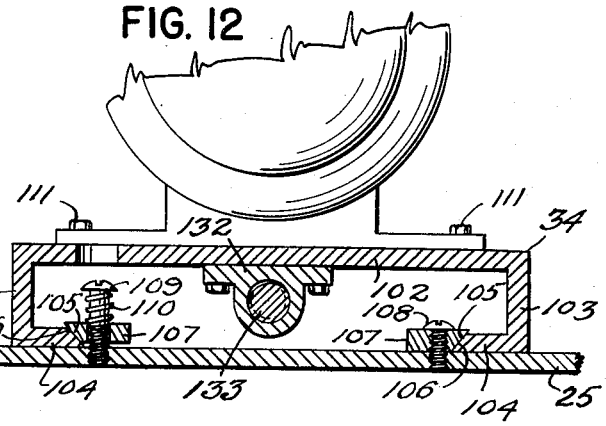
FIG. 12
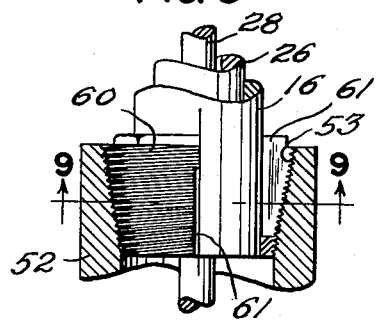
FIG. 8
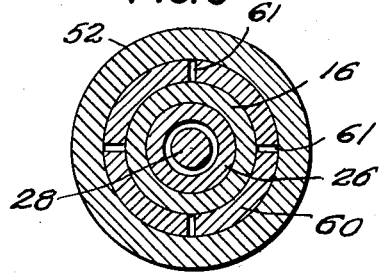
FIG. 9
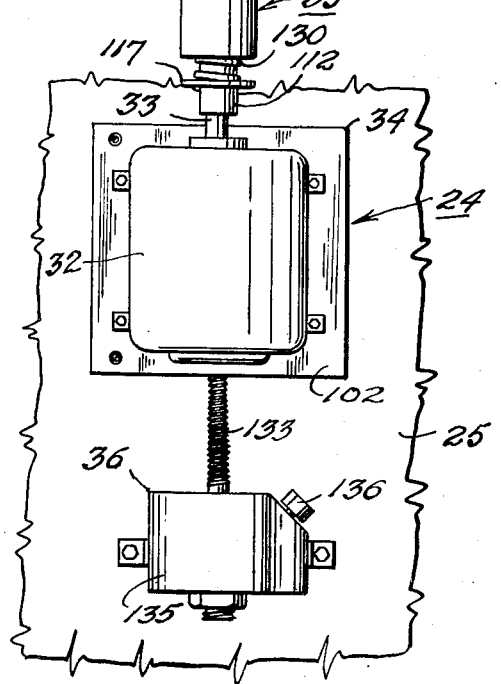
INVENTOR.
Paul Weynand

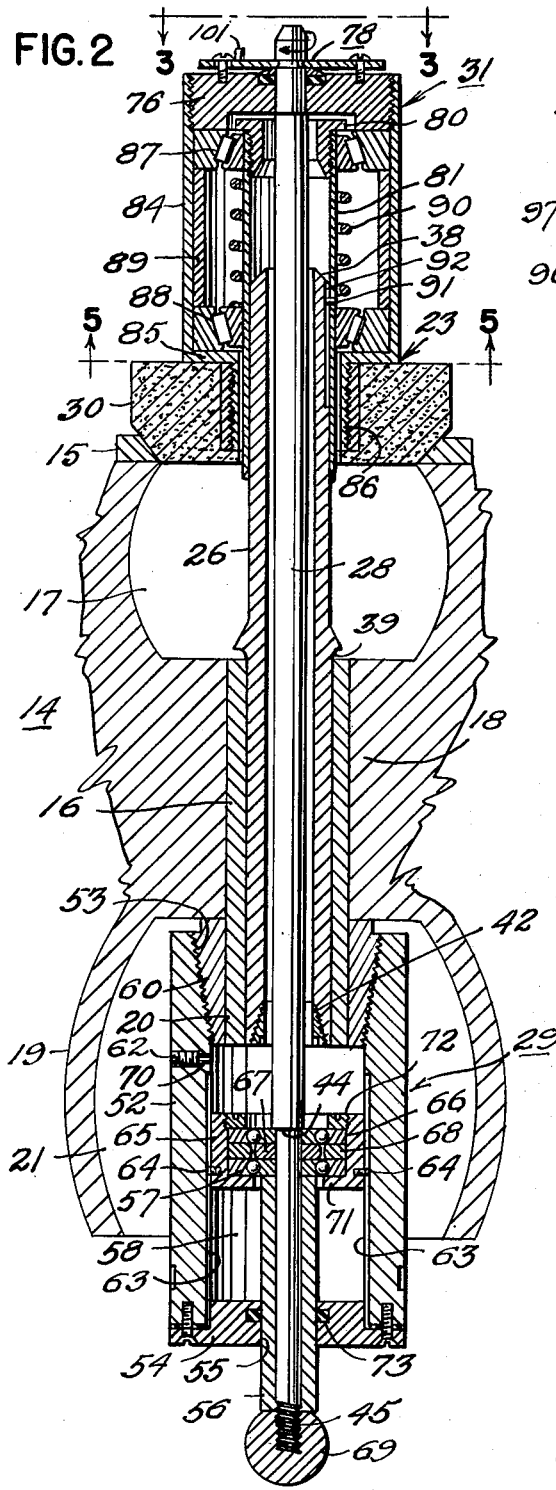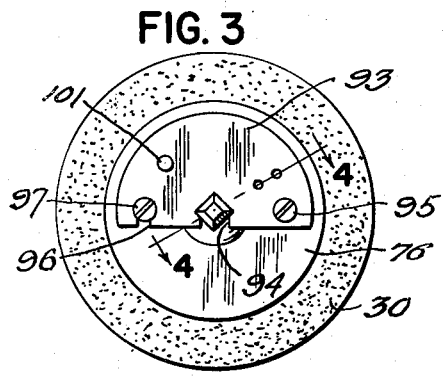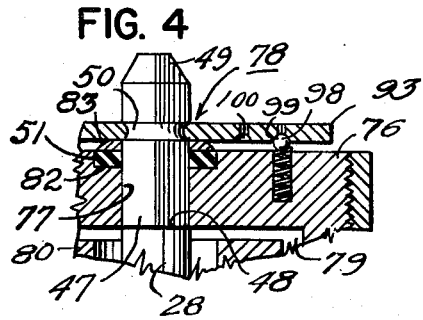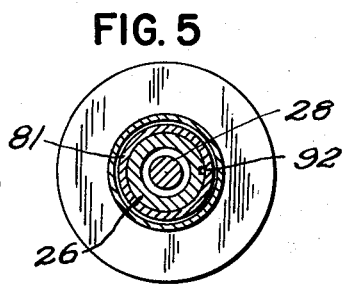

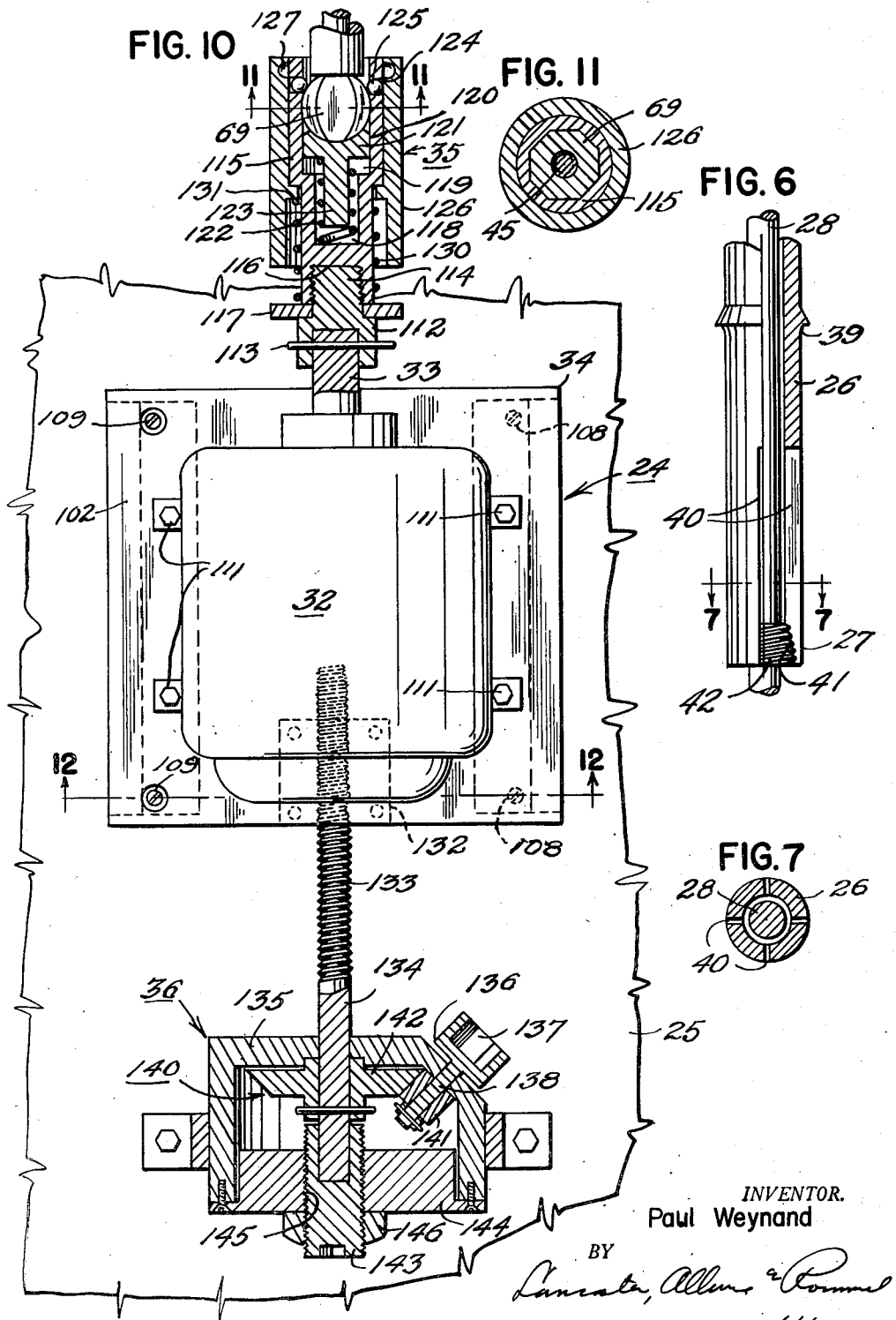

Patented Aug. 18, 1953

2,648,938

UNITED STATES PATENT OFFICE 2,648,938

VALVE SEAT GRINDING APPARATUS

Paul Weynand, San Antonio, Tex.

Application December 29, 1952, Serial No. 328,294

12 Claims. (Cl. 51—241)

My invention to valve seat grinding apparatus, and more particularly to apparatus most suitable for acting upon the intake and exhaust valve seats of internal combustion engines, especially aircraft engines, although not necessarily limited to such.

The principal object of the invention is to provide apparatus which may be quickly and accurately assembled with respect to parts of the engine for operating the grinding element, preferably by an electric motor, and feeding the grinding element toward and against the valve seat with minute accuracy, so as to not grind more of the metal of the seat than is necessary to condition it for proper relationship with respect to the valve.

Another object is to provide apparatus embodying a drive shaft, adapted to extend through the opening of the valve seat, to which motion is imparted by the motor, and a unit, which carries the grinding element, which may be quickly attached to and in driven relationship to the drive shaft and quickly detached therefrom for the purpose of inspecting the valve seating surface of the seat, from time to time, and so as to discontinue further grinding when the seat has been properly surfaced.

A further object is to provide apparatus in which the driving shaft, for operating the grinding element or stone, extends through and beyond the usual pilot, into the zone in which the cam follower, following spring etc., usually operates, and impart rotation to such extending portion of the driving shaft, instead of to the end thereof which is adjacent to the valve seat.

Other objects and advantages of the present invention will appear in the following detailed description of the preferred embodiment thereof, taken in connection with the accompanying drawings, forming a part of this specification, and in which drawings:

Fig. 1 is a view of the apparatus in elevation, and showing a portion of a conventional engine, at the zone of the valve seat, guide etc., in vertical section.

Fig. 2 is an enlarged vertical sectional view of the apparatus through those portions thereof, coupled to the valve guide, grinding element and means for detachably connecting the grinding element to the drive shaft therefor, the shaft being shown in elevation.

Fig. 3 is an enlarged plan view looking in the direction of the arrows of line 3—3 of Fig. 2.

Fig. 4 is an enlarged sectional view on the line 4—4 of Fig. 3.

Fig. 5 is a sectional view on the line 5—5 of Fig. 2.

Fig. 6 is a view partly in elevation and partly in vertical section of the pilot, a portion of the drive shaft extending therethrough being shown in elevation.

Fig. 7 is a sectional view on the line 7—7 of Fig. 6.

Fig. 8 is a view partly in vertical section and partly in elevation of means for attaching the apparatus to the valve guide.

Fig. 9 is a sectional view on the line 9—9 of Fig. 8.

Fig. 10 is a view in elevation of the drive motor, and partly in elevation and partly in vertical section of means for feeding the grinding element toward and from the work.

Figs. 11 and 12 are sectional views on the lines 11—11 and 12—12, respectively, of Fig. 10.

In the drawings I disclose parts of an aircraft engine comprising a portion 14 of the engine body, a circular valve seat 15 and a cylindrical valve guide 16 carried by the body portion 14, all of which may be of conventional and well known design. In the example shown the body 14 provides a valve well 17, a constricted portion 18 supporting the guide 16 and a skirt portion 19 which surrounds a portion of the usual valve spring etc., not shown in the drawings. The end portion 20 of the guide extends into the chamber 21 formed by the skirt portion 19.

Broadly the apparatus, according to the present invention comprises engine carried mechanism 23 and mechanism 24 separate from the engine and which may be supported on a panel 25 as shown in Figs. 1 and 10 which in turn may form a part of a servicing stand or bench, not shown in the drawings.

The mechanism 23 comprises a tubular pilot 26 coaxial with and nonrotatably carried by the guide 16, and having a first or lower end portion in the zone of the guide and a second or upper end portion located beyond the valve seat 15; a means 27 for detachably connecting the pilot 26 to and coaxial with the guide 16; a drive spindle 28 extending through the pilot with its upper end portion extending upwardly beyond the valve seat 15 and its lower portion downwardly beyond the lower end of the pilot; a means 29 carried by the guide 16 retaining the spindle coaxial with the pilot and guide in a manner that the spindle may be rotated and moved axially; a circular grinding element 30 for acting upon the valve seat 15; and means 31 detachably securing the element 30 to the upper end portion of the spindle 28, coaxial therewith and for rotation and axial movement with the spindle.

The mechanism 24, in the example shown comprises an electric motor 32 including a drive shaft 33; means 34 slidably mounting the motor on the panel 25 for movement in a path longitudinally of the shaft 33; means 35 detachably coupling the shaft 33 to the lower end portion of spindle 28, and manually operable means 36 for moving the motor in the path above referred to and hence the shaft 33 in an axial direction whereby the grinding element, through the coupling means 35, spindle 28, and means 31 may be brought into contact with and separated from the valve seat 15.

Referring now to the pilot 26, its upper end portion may be tapered as at 38 to facilitate guiding a portion of means 31 upon the pilot; its intermediate portion may be provided with a tapered circumferential enlargement 39 which, in effect, forms a part of means 27 since it is for partial engagement in the upper end portion of guide 16, like a stopper; and its lower portion may be split longitudinally for a short distance providing the slits 40 shown in Figs. 6 and 7, and provided with a tapered, screw threaded bore 41 for receiving a tapered, screw threaded collet 42, which when turned tight expands the split end portion of the pilot into intimate contact with the bore of pilot 26. This collet together with the enlargement 39 comprises suitable means 27 for detachably connecting the pilot to and coaxial with the guide 16.

The drive spindle 28 is preferably made with its intermediate portion of a diameter appreciably less than the internal diameter of the bore of pilot 26 to avoid contact therewith. For purposes to be subsequently set forth the spindle has its lower end portion, below the lower end of pilot, of reduced diameter, providing a downwardly facing shoulder 44, and its lower terminal end screw threaded as at 45; and its upper end portion reduced to provide a polygonal or non-circular formation as at 47, and an upwardly facing shoulder 48, and terminating in a frusto-pyramidal or conical end 49 to facilitate disposing the means 30 in operative relation to the spindle. The upper end portion may also be provided with a circumferential groove 50 in a plane above the shoulder 48 for cooperation with a preferred part of means 30.

With reference to the means 29, at the lower portion of the engine carried mechanism 23, it may comprise a cylindrical bearing support housing 52, the upper end portion of which is provided with a tapered, screw threaded bore 53 and its lower end portion closed by a detachable cap 54 through a central opening 55 of which extends a portion of the lower end of spindle 28 and a surrounding retainer sleeve 56 engaging an inner race of a lower anti-friction ball bearing 57 disposed in the chamber 58 of the housing 52. The upper portion of the housing is closed by a tapered collet 60 received in bore 53, the collet being split longitudinally to provide slits 61 shown in Figs. 8 and 9. The internal diameter of the collet is normally such as to permit its being slipped on the lower end portion 20 of the guide 16, but when screwed home, tightly embraces the guide and secures the housing 52 to the guide. The housing may be provided, near its upper end with a lateral port 70 through which lubricant may be introduced in the chamber 58, the port being closed by a plug 62. The housing 52 is also provided with parallel, longitudinal slots 63 in the wall of chamber 58 open to the bottom of the chamber for the reception of lugs 64 on a bearing carrier 65 which supports the outer race of lower bearing 58 as well as the outer race of an upper anti-friction ball bearing 66, the lugs in the slots preventing rotation of the outer races but permitting bodily movement of the bearings longitudinally in the chamber 58. The inner race of bearing 66 abuts against shoulder 44. An inner spacer ring 67 and an outer spacer ring 68 are disposed between the inner and outer races, respectively, of the bearings 57 and 66. The inner races and ring 67 are clamped tight to the spindle between the shoulder 44 and the upper end of retainer sleeve 56 by a nut 69 on the screw threaded end 45 of the spindle which engages the lower end of the retainer sleeve. The outer races and the ring 68 are clamped tight upon a lower flange 71 of carrier 65, by a screw threaded retainer ring 72. A suitable oil seal ring 73 may be provided in cap 54 surrounding the retainer sleeve 56.

Circular grinding elements 30 are currently available provided with an internally screw threaded bushing 75 and the means 31, in the example shown, is for association with such bushing. Such means includes a peripherally screw threaded driving disk 76 connected with the spindle 28 for rotation and axial movement therewith, as by the provision of a noncircular hole 77 therein to slidably fit onto the noncircular formation 47 of and rest on the shoulder 48 of spindle 28, with a latch mechanism 78 cooperating with the groove 50 to hold it firmly in place. For compactness the underface of disk 76 has a concentric circular recess 79 to receive the upper end of an externally screw threaded retaining collar 80 associated with the upper end portion of an internally screw threaded inner bearing race sleeve 81 which telescopes on the upper end portion of pilot 26. The upper face of the disk is also preferably provided with a concentric circular recess 82 in which is disposed a circular resilient member 51 surmounted by a metallic ring 83 preferably rounded at its upper peripheral portion as shown in Fig. 4. The disk 76 is in screw threaded engagement with a depending combined bearing housing and carrier 84 for the grinding element 30. The lower end of the housing portion has an inwardly extending flange 85 and a depending externally threaded nipple 86 upon which the bushing 75 is screwed to bear against the flange 85. Within the chamber of housing 84 is an upper anti-friction roller thrust bearing 87 the outer race of which engages disk 76 and the inner race, the sleeve 81 and the head of collar 80. Also within the chamber of the housing is a lower anti-friction roller thrust bearing 88 the outer race of which engages flange 85 and the inner race, the sleeve 81, there being a spacer sleeve 89 between the outer races of bearings 88 and 89. The disk 76 is used to press the outer races and sleeve 89 tight against flange 85 and so that they rotate with the housing 84. The inner races of the thrust bearings are held in proper bearing relation with the rollers thereof by an expansion spring 90 as shown in Fig. 2. The inner bearing race sleeve 81 is provided with a lug 91 extending in a longitudinal groove 92 open to the upper end and the side of pilot 26 to restrain the sleeve 81 from rotation, and permit the grinding element carrier means to be removed from association with the pilot and spindle 28.

The latch mechanism 78 comprises a segmental latch plate 93 having a symmetrical disposed notch 94 to receive the neck of the spindle 28 at the groove 50, the plate 93 being pivoted, as by screw 95, so that it may be swung to an unlatched position. The plate 93 bears upon the ring 83 when in a latched position and preferably causes slight compression of the ring 51. To assist in holding the plate 93 in a latched position it is provided with a notch 96 offset from notch 94 to receive the shank of a headed screw 97. To facilitate latching and unlatching the plate is provided with an upstanding finger piece or lug 101 remote from the pivot screw 95. There may also be provided a spring urged ball 98 carried by plate 93 adapted to engage in a recess 99 open to the underside of the plate when it is in a latched position and to engage in a similar recess 100 when unlatched.

Referring now to the mechanism 24 more in detail, and as shown in Figs. 1, 10 and 12, the motor 32 may be electrically operated and of standard make, since it is not necessary to make it small enough to enter the cylinder of a radial type aircraft engine of the general character shown in Patent No. 2,363,384 granted November 21, 1944, the motor of the present apparatus being exteriorly of the engine cylinder. The means 34 slidably mounting the motor 32 may include a base plate 102 provided with parallel webs 103 extending from one face thereof, and inwardly projecting flanges 104 on the webs parallel to each other and to the plane of base 102. The confronting edges of the flanges are beveled as at 105 for slidable engagement with the beveled faces 106 of rails 107 secured to the panel 25 as by screws 108 and 109. The latter screws may be relatively long and have expansion springs 110 encircling their shanks and bearing against the screw heads and the respective rail they support to guard against lateral play between the rails and their respective flanges and which might otherwise result in vibration when the apparatus is in use. The motor 32 is secured to base plate 102 by screw 111.

Means 35 in the example shown more particularly in Figs. 1, 10 and 11, includes a connecting member 112 secured to an end of the shaft of the motor as by cross pin 113, the member 112 being provided with an externally screw threaded projection 114; and a socket carrying cup 115 provided with a lower end screw threaded socket 116 receiving the projection with a relatively large washer 117 interposed between the two. The "hollow" of cup 115 is stepped so as to have a relatively deep but narrow lower, closed-bottom chamber 118 and a larger upper chamber 119 which is octagonal in cross-section as shown in Fig. 11. In the example shown, the nut 69 functions also as a part of means 35 and therefore is also of somewhat modified spherical shape in that it is octagonal in horizontal cross section to fit, with sliding contact, the walls of chamber 119 and act as a universal joint therewith. The chamber 119 has therein a socket member 120 the head 121 of which engages the bottom of nut 69 and the depending stem 123 of which extends partially into the chamber 118. An expansion spring 122 surrounds the stem and urges the socket member 120 into intimate contact with the lower portion of nut 69. In order to detachably couple the nut to the cup 115 so that a downward pull upon same will be transmitted to the spindle 28, I provide a plurality of radial holes 124 in the wall of chamber 119 adjacent the upper portion thereof, having constricted openings to the chamber 119 in which are balls 125 of a diameter slightly greater than the thickness of the chamber wall. These balls are adapted to be forced partially through the constricted openings of holes 124 to engage the nut 69 above its girth, as shown in Fig. 10, by a sleeve 126 telescopically arranged about the socket carrying cup 115 and normally spring biased to a position where the balls 126 engage the inner face of the sleeve when the balls are in coupling relation to the nut. However, the sleeve 126 is provided with a circumferential groove 127 open to its interior and normally above the holes 124. It is into this groove 127 that the balls may move when the sleeve 126 is lowered against action of expansion spring 130 interposed between a shoulder 131 of sleeve 126 and the washer 117, so as to detach the nut 69 and socket carrying cup one from the other.

The means 36 in the example shown comprises a nut 132 rigid with the motor 32, the axis of the nut being parallel with the path of movement of the motor; a screw 133 in threaded engagement with the nut, and having a shank 134 rotatably carried by and extending into a housing 135 mounted on the panel 25; a member 136 which is provided with a socket portion 137 adapted to be manually rotated, as by any suitable wrench, not shown in the drawing, and a shank 138 rotatably carried by and extending into the housing 135; and speed reducing gearing 140 within the housing 135 operatively connected to the shanks 138 and 134 for imparting rotation of the former to the latter. The gearing 140 may comprise a pinion 141, rigid on shank 138, and a gear 142 in meshing relation therewith, the gear being rigid on shank 134. The end of shank 134 opposite the screw 133 may be received in an adjustable step bearing 143 carried by a removable bottom 144 forming a part of the housing 135. The step bearing is externally threaded for reception in a screw threaded opening 145 in bottom 144, and a lock nut 146 is provided to retain the step bearing in an adjusted position.

The operation of the apparatus may well be understood from the foregoing detailed description of a typical embodiment of my invention. However, it is desired to point out that important features of the invention are the ability of the workman to accurately attach the engine carried mechanism 23 in place against vibration; the motor 32 being outside the cylinder of the engine, in the case of a radial type aircraft engine, a relatively large, inexpensive motor may be used without the necessity of using a flexible shaft; the grinding operation may be carried out with precision, since the means 36 provides very minute feeding of the grinding element 30 against the work upon one turn of the manually operable member 136 due to speed reducing gearing 140 and the screw 133 actuating the nut 132; the resilient member 51 may yield in the event that means 36 is operated so rapidly as to be likely to overload the motor or excessively heat the grinding wheel and valve seat, if there was a positive feeding of the grinding wheel upon the work; and the workman may inspect the progress being made during the grinding operation at frequent intervals by unlatching and removing the means 31 from the drive spindle without disturbing the rest of the mechanism.

I claim:

1. In grinding apparatus for use with a circular valve seat and valve stem guide, carried by an engine body portion, the combination of engine carried mechanism comprising, a pilot coaxial with and nonrotatably carried by said guide, a spindle extending through said pilot having a first end portion extending beyond the guide at its end remote from the seat and a second end portion extending beyond the seat, a first means carried by the engine body portion supporting said spindle for rotation and longitudinal movement coaxial with said pilot, a circular valve grinding element, and a second means coupling said grinding element to and for rotation with said second end portion of the spindle; and second mechanism separate from the engine for rotating and imparting longitudinal movement to said spindle, comprising, a rotatable and axially movable drive shaft, a third means coupling said shaft with said spindle, and manually operable means for moving said drive shaft longitudinally whereby said grinding element may be brought into contact with and separated from the valve seat.

2. The combination of claim 1 in which said second means includes latch mechanism associated with the spindle whereby the second means and grinding element may be removed from the spindle for inspection of the valve seat while the remainder of said engine carried mechanism remains in place.

3. The combination of claim 1 in which said drive shaft is a part of a motor mounted for movement in a path longitudinally of the shaft and said manually operable means is operatively connected to the motor for bodily moving it in said path.

4. The combination of claim 3 in which said manually operable means comprises an element to which rotation may be manually imparted, a rotatable screw, a nut therefor rigid with said motor, and speed reducing gearing between said last named element and screw for imparting movement of the former to the latter.

5. The combination of claim 1 in which said third means includes a universal joint between the drive shaft and spindle.

6. In grinding apparatus for use with a circular valve seat and valve stem guide coaxial therewith, the combination of a tubular pilot coaxial with said guide, extending through the opening of said valve seat and having a first end portion in the zone of said guide and a second opposite end portion beyond said seat, a first means detachably connecting said first end portion to said guide, a drive spindle extending through said pilot and beyond the second end portion thereof and reciprocable axially of said pilot, a circular valve seat grinding element, and a second means detachably connecting said grinding element to said spindle at its portion beyond said second end portion of the pilot for rotation with the drive spindle.

7. The combination as specified in claim 6, in which the first end portion of the pilot is split longitudinally and is provided with a tapered, screw threaded bore, and said first means includes a screw threaded tapered collet in screw threaded engagement in said bore and expands the pilot into intimate contact with the interior of said guide.

8. The combination as specified in claim 7, in which said first means includes a tapered circumferential enlargement engaging in the end portion of the guide nearest said seat.

9. The combination as specified in claim 6, in which said second means comprises a driving disk detachably connected to and revoluble with said spindle, a combined outer bearing housing revoluble with said disk and carrying said grinding element, a non-rotative inner bearing sleeve carried by and coaxial with said pilot, and antifriction bearings including outer and inner races engaging said housing and sleeve, respectively.

10. The combination as specified in claim 9, in which said antifriction bearings are of the thrust type arranged in opposed relationship and an expansion coil spring acts upon the inner races to keep the bearings true.

11. In grinding apparatus for use with a circular valve seat and valve stem guide coaxial therewith, the combination of a tubular pilot coaxial with said guide, extending through the opening of said valve seat and having a first end portion in the zone of said guide and a second opposite end portion beyond said seat, a first means detachably connecting said first end portion to said guide, a drive spindle extending through said pilot and beyond the second end portion thereof and reciprocable axially of said pilot, a circular valve seat grinding element, a second means detachably connecting said grinding element to said spindle, at its portion beyond said second end portion of the pilot for rotation with the drive spindle, and a third means retaining the spindle coaxial with the pilot.

12. The combination as specified in claim 11, in which said third means comprises a bearing housing, through which said spindle extends, detachably connected to said guide adjacent to the first end portion of the pilot, and an antifriction bearing in said housing, including an outer race non-rotatably carried by said housing and slidable longitudinally thereof, and an inner race rotatable with the spindle and movable axially therewith.

PAUL WEYNAND.

No references cited.